(12) United States Patent
Hutton et al.

(10) Patent No.: US 8,423,968 B2
(45) Date of Patent: Apr. 16, 2013

(54) TEMPLATE-BASED VERTICAL MICROCODE INSTRUCTION TRACE GENERATION

(75) Inventors: David S. Hutton, Tallahassee, FL (US); Jane H Bartik, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1272 days.

(21) Appl. No.: 12/029,075

(22) Filed: Feb. 11, 2008

(65) Prior Publication Data
US 2009/0204950 A1 Aug. 13, 2009

(51) Int. Cl.
G06F 9/44 (2006.01)
G06F 11/00 (2006.01)
G06F 9/00 (2006.01)

(52) U.S. Cl.
USPC .............. 717/128; 714/33; 712/242; 712/243

(58) Field of Classification Search .................. None
See application file for complete search history.

(56) References Cited

U.S. PATENT DOCUMENTS

| | | | |
|---|---|---|---|
| 4,443,865 A * | 4/1984 | Schultz et al. ................. | 712/242 |
| 4,491,912 A * | 1/1985 | Kainaga et al. ............... | 712/243 |
| 5,222,244 A * | 6/1993 | Carbine et al. ................ | 712/41 |
| 5,226,164 A | 7/1993 | Nadas et al. | |
| 5,274,811 A | 12/1993 | Borg et al. | |
| 5,465,361 A * | 11/1995 | Hoenninger, III ............ | 717/168 |
| 5,652,889 A | 7/1997 | Sites | |
| 5,721,855 A | 2/1998 | Hinton et al. | |
| 5,845,064 A * | 12/1998 | Huggins ........................ | 714/33 |
| 6,021,484 A | 2/2000 | Park | |
| 6,029,262 A * | 2/2000 | Medd et al. ................... | 714/724 |
| 6,609,247 B1 * | 8/2003 | Dua et al. ..................... | 717/128 |
| 6,618,801 B1 * | 9/2003 | Knebel et al. ................ | 712/215 |
| 6,625,759 B1 * | 9/2003 | Petsinger et al. .............. | 714/28 |
| 6,643,800 B1 * | 11/2003 | Safford et al. ................ | 714/35 |
| 6,834,359 B2 | 12/2004 | Boehm et al. | |
| 7,085,964 B2 * | 8/2006 | Fournier et al. ............... | 714/33 |

(Continued)

OTHER PUBLICATIONS

Firth N., "The Role of Software Tools in the Development of the Eclipse MV/8000 Microcode", Proceedings of the 13$^{th}$ Annual Workshop on Microprogramming [online], 1980 [retrieved Jun. 28, 2012], Retrieved from Internet: <http://dl.acm.org/citation.cfm?id=802711>, pp. 54-58.*

(Continued)

Primary Examiner — Don Wong
Assistant Examiner — Todd Aguilera
(74) Attorney, Agent, or Firm — Cantor Colburn LLP; John Campbell

(57) ABSTRACT

Method, system and computer program product for template-based vertical microcode instruction trace generation. An exemplary embodiment includes an instruction trace generation method, including generating a testcase for a millicoded instruction in an instruction trace pool, wherein the millicoded instruction is included in a parent instruction trace, processing the testcase to generate a millicode instruction trace snippet, editing the millicode instruction trace snippet to generate a templatized millimode snippet, processing the parent instruction trace, accessing the templatized millimode snippet, updating the templatized millimode snippet with a value from the parent instruction trace, and generating a millicoded instruction trace from the updated templatized millimode snippet.

17 Claims, 7 Drawing Sheets

U.S. PATENT DOCUMENTS

| | | | |
|---|---|---|---|
| 7,139,936 B2* | 11/2006 | Petsinger et al. | 714/28 |
| 7,140,003 B2 | 11/2006 | Decker | |
| 7,360,203 B2* | 4/2008 | Ober et al. | 717/128 |
| 2004/0039966 A1* | 2/2004 | Petsinger et al. | 714/28 |
| 2004/0064267 A1* | 4/2004 | Safford et al. | 702/35 |
| 2005/0177819 A1* | 8/2005 | Ober et al. | 717/128 |
| 2006/0265691 A1* | 11/2006 | Klinger et al. | 717/124 |
| 2007/0055911 A1 | 3/2007 | Boehm et al. | |
| 2008/0127107 A1* | 5/2008 | Kosche et al. | 717/128 |

OTHER PUBLICATIONS

Wile, B., et al. "Functional Verification of the CMOS S/390 Parallel Enterprise Server System," IBM Journal of Research and Development [online], vol. 41 No. 4.5, 1997 [retrieved Nov. 29, 2012], Retrieved from Internet: <http://ieeexplore.ieee.org/stamp/stamp.jsp?tp=&arnumber=5389336>, pp. 549-566.* z/Architecture Principles of Operation, International Business Machines Corporation, SA22-7832-05, Sixth Edition (Apr. 2007).

* cited by examiner

```
I  00:00:00  82        04E22000 00000FF8  BAKR
M  2  04E22000         A30F0040A309
M  2  04E22004         A3098000A361
           ......

M  2  04E9A21E         AB0109C4A55F
M  2  04E9A222         A55F00A8E360
M  2  04E9A226         E360B0000004  <CR15&7fffff8>      ///linkage stack/header entry
M  2  04E9A22C         AB190F00BD53
M  2  04E9A230         BD53B002A724
M  1  04E9A234         A724004EBF53
M  2  04E9A2D0         BF53B002A751  <CR15&7fffff8+2>    ///RFS/remaining free space
M  2  04E9A2D4         A7510007A774
M  0  04E9A2D8         A774002658B5  <CR15&7fffff8+2>    ///RFS/remaining free space
M  2  04E9A2DC         58B5B00CA7B0
M  2  04E9A2E0         A7B08000A784  <CR15&7fffff8+9C>   //LSEA + 9C/modifiable area
           ....

| | | | | | |
|---|---|---|---|---|---|
| I | 00:00:00 | 82 | 04E22000 | 0000FF8 | BAKR |
| M | 2 | | 04E22000 | A30F0040A309 | |
| M | 2 | | 04E22004 | A3098000A361 | |

· · · · ·

| | | | | | |
|---|---|---|---|---|---|
| M | 2 | | 04E9A21E | AB0109C4A55F | |
| M | 2 | | 04E9A222 | A55F00A8E360 | |
| M | 2 | | 04E9A226 | E360B0000004 | 15791000:06ADE010 |
| M | 2 | | 04E9A22C | AB190F00BD53 | |
| M | 2 | | 04E9A230 | BD53B002A724 | 15791000:06ADE012 |
| M | 1 | | 04E9A234 | A724004EBF53 | |
| M | 2 | | 04E9A2D0 | BF53B002A751 | 15791000:06ADE012 |
| M | 2 | | 04E9A2D4 | A75100007A774 | |
| M | 0 | | 04E9A2D8 | A774002658B5 | |
| M | 2 | | 04E9A2DC | 58B5B00CA7B0 | 15791000:06ADE0AC |
| M | 2 | | 04E9A2E0 | A7B08000A784 | |

· · · ·

| | | | | | | | | |
|---|---|---|---|---|---|---|---|---|
| M | 1 | | 04E98612 | A41100027A38C | | | | |
| M | 2 | | 04E98660 | A38C00000000 | | | | |
| J | 1a9a930a | 1579107f | 0 | 986e5 | ffffffff | 95ff30a | dddddddd | dddddddd dddddddd dddddddd dddddddd |

FIG. 6

TEMPLATE-BASED VERTICAL MICROCODE INSTRUCTION TRACE GENERATION

BACKGROUND OF THE INVENTION

This invention relates to instruction tracing as an input to microprocessor performance analysis, and particularly to generation of instruction traces for vertical microcode not visible within the scope of traditional instruction trace collection.

Microprocessor performance modeling requires assembly-level instruction traces as input. Super-CISC microprocessors have a "vertical microcode" (aka "millicode") engine to devolve some CISC instructions into a stream of RISC instructions, much in the same spirit as a function call in a high-level programming language. However these millicode instructions are internal to the microprocessor and not apparent to instruction trace-capturing utilities. Consequently, the performance model is forced to "approximate" the specific behavior of the actual millicode routine.

BRIEF SUMMARY OF THE INVENTION

An exemplary embodiment includes an instruction trace generation method, including generating a testcase for a millicoded instruction in an instruction trace pool, wherein the millicoded instruction is included in a parent instruction trace, processing the testcase to generate a millicode instruction trace snippet, editing the millicode instruction trace snippet to generate a templatized millimode snippet, processing the parent instruction trace, accessing the templatized millimode snippet, updating the templatized millimode snippet with a value from the parent instruction trace, and generating a millicoded instruction trace from the updated templatized millimode snippet.

Another exemplary embodiment includes a vertical microcode instruction trace generation system, including a processor including instructions internally specified by vertical microcode, an instruction trace including a sub-set of the vertical microcode specified instructions and a testcase generator configured to target each of the subset of vertical microcode specified instructions.

A further exemplary embodiment includes an instruction trace generation method, including generating a testcase for a millicoded instruction in an instruction trace pool, wherein the millicoded instruction is included in a parent instruction trace, generating a millicode instruction trace snippet from the testcase and generating a templatized millimode snippet from the millicode instruction trace snippet.

An addition exemplary embodiment includes an instruction trace generation method, including receiving a parent instruction trace having a millicode instruction, accessing a templatized millimode snippet, updating the templatized millimode snippet with a value from the parent instruction trace and generating a millicoded instruction trace from the updated templatized millimode snippet.

BRIEF DESCRIPTION OF THE DRAWINGS

Referring now to the drawings wherein like elements are numbered alike in the several FIGURES:

FIG. 5 illustrates one example of a templatized millimode snippet in accordance with an exemplary embodiment;

FIG. 6 illustrates one example of a specified millimode snippet; and

DETAILED DESCRIPTION OF EXEMPLARY EMBODIMENTS

In an exemplary embodiment, the systems and methods described herein obtain millicode-instruction trace information to be paired with the existing "parent" instruction trace. In an exemplary embodiment, the systems and methods described herein generate a "templatized millicode snippet" (or a generic instruction trace-like sequence) for each millicoded instruction of interest, and rifle through a parent instruction trace and create a proper millicode instruction trace sequence by completing and stitching-together the appropriate "templatized snippets". In an exemplary embodiment, by feeding the microprocessor performance model with both the parent trace and the generated millicode instruction trace, true millicode coverage is realized rather than an approximation.

Figure 1:
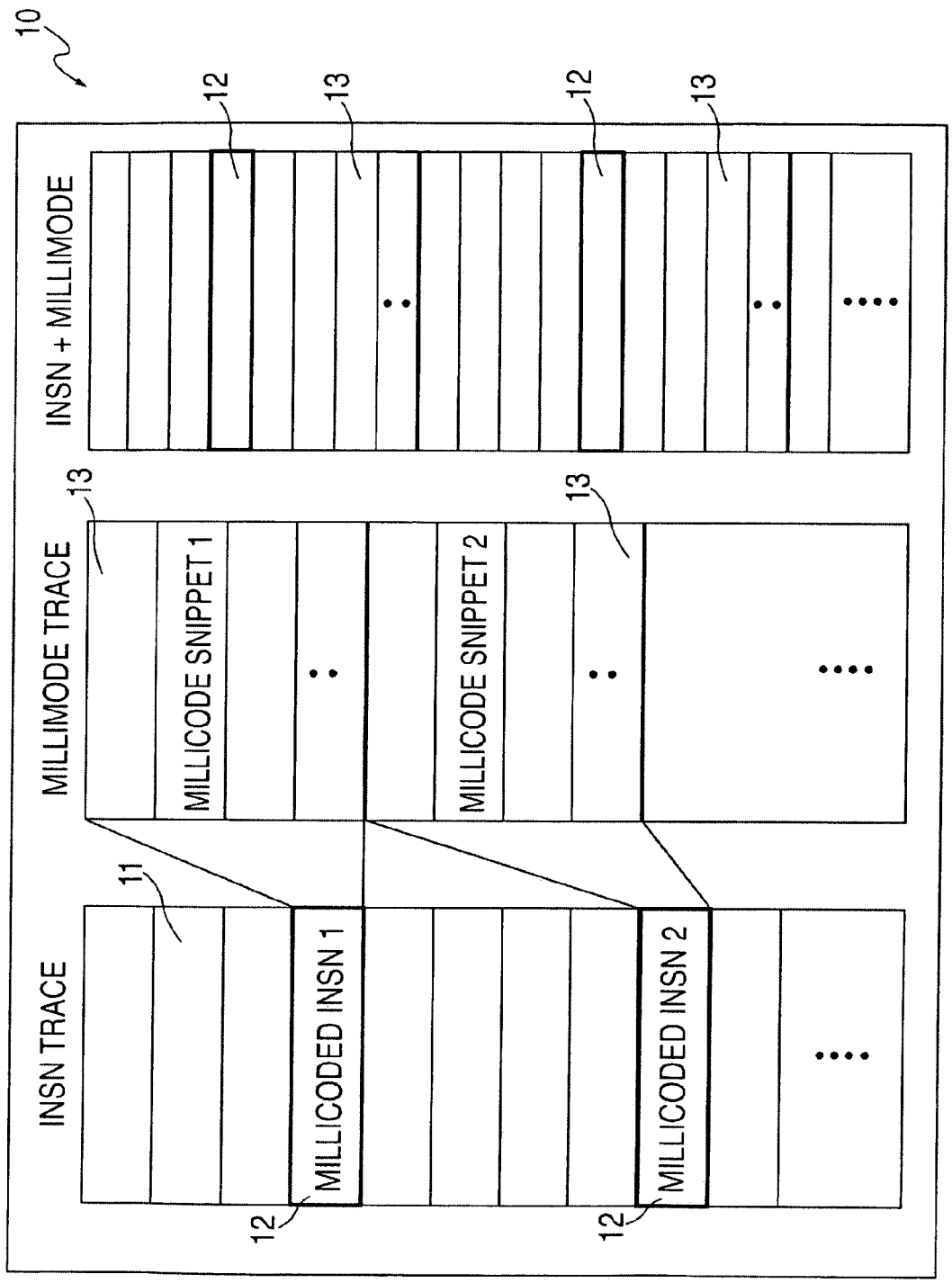
FIG. 1 illustrates one example of a block diagram of an exemplary instruction flow.

FIG. 1 illustrates one example of a block diagram 10 of an exemplary flow. An instruction trace 11 is shown on the left with "millicoded" instructions 12 scattered throughout. A new "millimode Instruction Trace" 13 generated by the systems and methods described herein, where each group of millimode instructions correlates to the expansion of a single millicoded instruction 12 on the instruction trace 13. The left column illustrates the apparent instruction stream to the performance model as known in the prior art. The right column shows the apparent instruction stream to the performance model in accordance with an exemplary embodiment.

Figure 2:
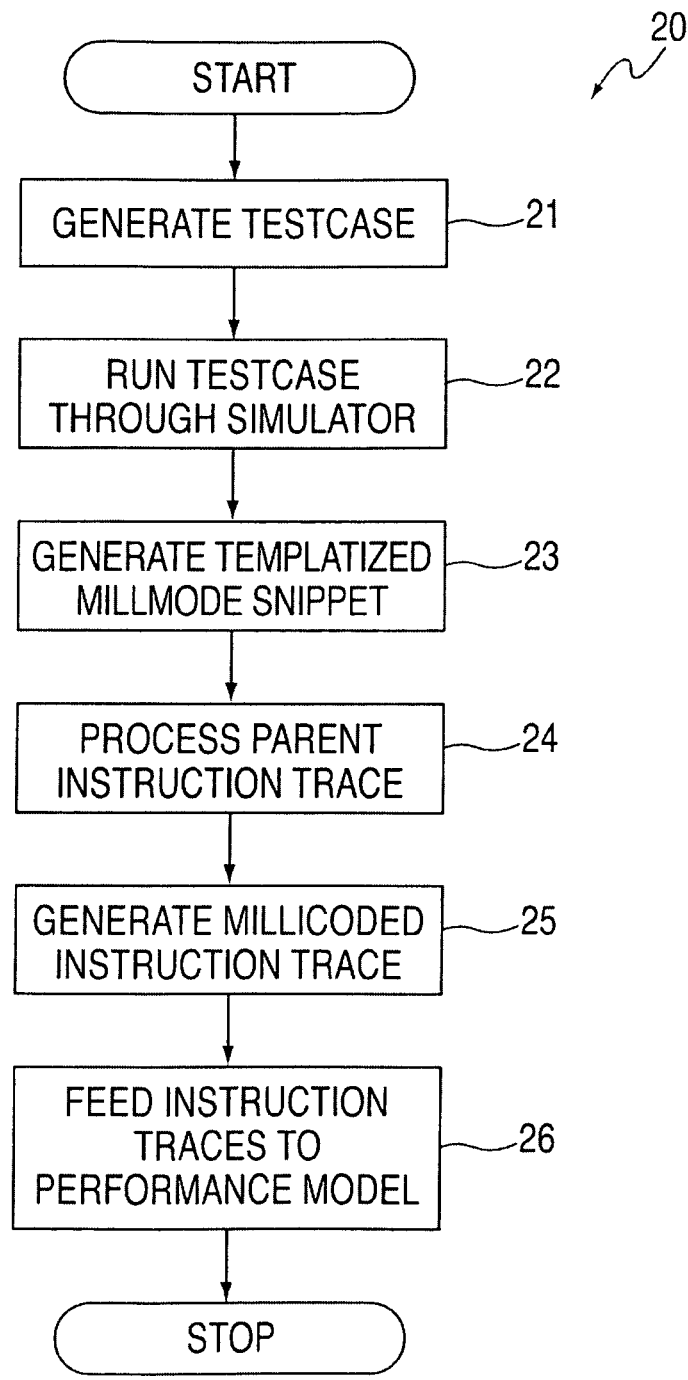
FIG. 2 illustrates a method for template-based vertical microcode instruction trace generation in accordance with an exemplary embodiment.

FIG. 2 illustrates a method 20 for template-based vertical microcode instruction trace generation in accordance with an exemplary embodiment. In an exemplary embodiment, at block 21 a testcase (i.e., an Architecture Verification Program (AVP)) is generated for every flavor of every millicoded instruction seen in the normal instruction trace pool. At block 22, these "specific" testcases are run through a millicode simulator, whose raw output is then post-processed by a small program into a "specific" millicode Instruction Trace "snippet", one per millicoded instruction. At block 23, these then undergo a one-time hand editing, where "specific" information is supplanted with "templatized" information (e.g., replacing "specific" operand address "0xff32d00" with a "templatized hook" of "<OP1&0xFFFFFF00>"), indicating this particular operand address is based on OP1 of the millicoded instruction and the masking of certain bits. In exemplary embodiments, the templatization process includes "loop specification", whereby a repeating loop of instructions is captured once (rather than explicitly specified a variable 'n'-number of times), and hooks are used to demark the loop beginning and end, an optional incremental offset that can be used to adjust operand addresses within the loop, and the number of iterations through the loop itself. This hand-editing process is described as "converting a specific millicode snippet into a templatized millicode snippet." At block 24, once all the templatized snippets are created, another program processes a parent instruction trace, one instruction at a time. When a millicoded instruction is encountered, the appropriate templatized snippet is accessed and the templates are updated with values specific to the millicoded instruction on the parent instruction trace. At block 25, the ordered sequence of these newly created specific millicode snippets yields a "millicoded instruction trace" to be paired with its "parent instruction trace". At block 26, the trace reader used by the microprocessor performance model is outfitted to accept both trace streams, feeding the model from the parent instruction trace until a millicoded instruction is encountered, at which point it feeds from the millicoded instruction trace until the end of that particular routine, then back from the parent trace. The process is repeated as necessary.

Figure 3:
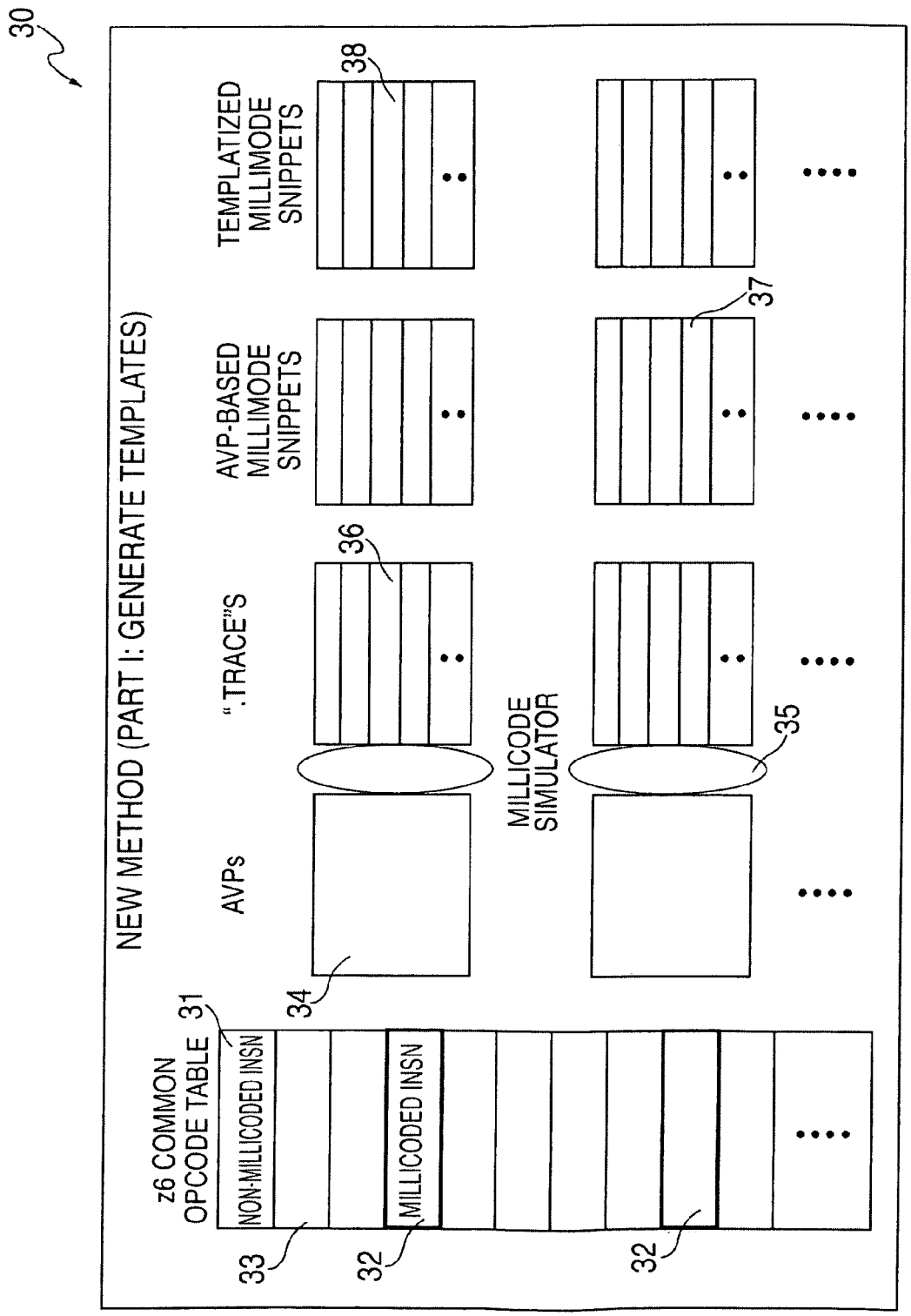
FIG. 3 illustrates one example of a template generation in accordance with an exemplary embodiment, in which templatized millimode snippets are generated.

FIG. 3 illustrates one example of a block diagram 30 of a template generation in accordance with an exemplary embodiment, in which templatized millimode Snippets are generated. In an exemplary embodiment, operand addresses are the most common "templatized" item in a millimode snippet. For example, templatization supplants "specific" information with "templatized" information; i.e., replacing "specific" operand address "0xff32d00" with a "templatized hook" of "<OP1&0xFFFFFF00>", indicating this particular operand address is based on OP1 of the millicoded instruction and the masking of certain bits, etc. In an exemplary embodiment, the templatization process further includes "loop specification", whereby a repeating loop of instructions is captured once (rather than explicitly specified a variable 'n'-number of times), and hooks are used to demark the loop beginning and end, an optional incremental offset that can be used to adjust operand addresses within the loop, and of course, the number of iterations through the loop itself.

In an exemplary embodiment, an opcode table 31 in a processor can include both millicoded instructions 32 and non-millicoded instruction 33. In an exemplary embodiment, the opcode table 31 is in a vertical microcode format. As described above, at least one testcase (AVP) 34 is created for every millicoded instruction 32 in the micro architecture and thus included a millicode parent. The testcase 34 is then fed through a Millicode Simulator 35 yielding a ".trace" file 36. The ".trace" is converted via a small program into a "Millimode snippet" 37 and has all the operand and loop behavior from a Millicode parent (e.g., the instruction trace 11 in FIG. 1) specified in the AVP 34. These are then edited into "templatized snippets" 38 where specific operand and loop behaviors are replaced with "hooks" that specify how to recreate these values for any instance of this millicoded parent instruction. In an exemplary embodiment, as described above, the templatization process can be done by hand the first time to determine what facilities are used to construct operand addresses and loop counts—the millicode source can be referenced. Templatization on the second-through-nth iterations (when millicode source is updated) may be automated.

Figure 4:
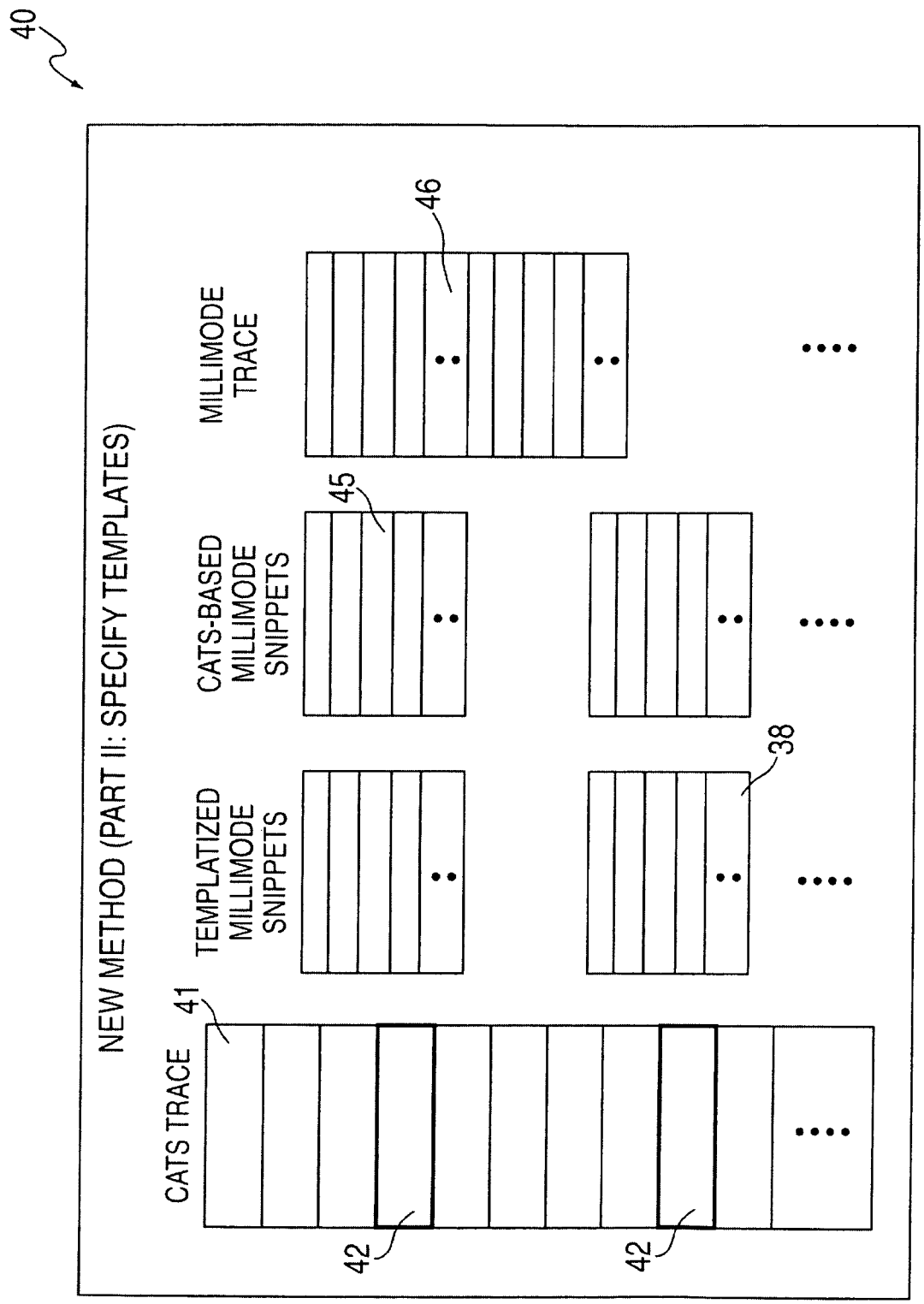
FIG. 4 illustrates one example of a block diagram of templates specification, where templatized millimode snippets are fully specified for each millicoded instruction on the instruction trace and stitched together to form a millimode instruction trace to be paired with the original instruction trace.

FIG. 4 illustrates one example of a block diagram 40 of templates specification, where templatized millimode snippets are fully specified for each millicoded instruction on the instruction trace and stitched together to form a millimode instruction trace to be paired with the original instruction trace. Once all the templatized snippets are created, another program processes a parent instruction trace, one instruction at a time. When a millicoded instruction is encountered, the appropriate templatized snippet is accessed and the templates are updated with values specific to the millicoded instruction on the parent instruction trace. The ordered sequence of these newly created specific millicode snippets yields a "millicoded instruction trace" to be paired with its "parent instruction trace".

In an exemplary embodiment, a program processes each CMS Adjunct tracing system CATS trace 41 of the processor, instruction by instruction. When a millicoded instruction 42 is identified, an appropriate "templatized snippet" 38 (see FIG. 2) is recalled, and its hooks are computed into real values based on data available in the CATS record (see FIGS. 5 and 6 below). The CATS-based millimode snippets 45 are then concatenated, forming a millimode trace 46, which may then be presented to the performance model. In an exemplary embodiment, a trace reader used by the microprocessor performance model is outfitted to accept both trace streams (e.g., the instruction trace 11 and millimode trace 13 in FIG. 1), feeding the model from the parent instruction trace until a millicoded instruction 42 is encountered, at which point it feeds from the millicoded instruction trace 13 until the end of that particular routine, then back from the parent trace, and so on.

FIG. 5 illustrates one example of a templatized millimode snippet, with "hooks" shown between angle braces "< >". FIG. 6 illustrates one example of a specified millimode snippet, where the "hooks" in FIG. 5 have been replaced with real values pertaining to a specific millicoded instruction.

Figure 7:
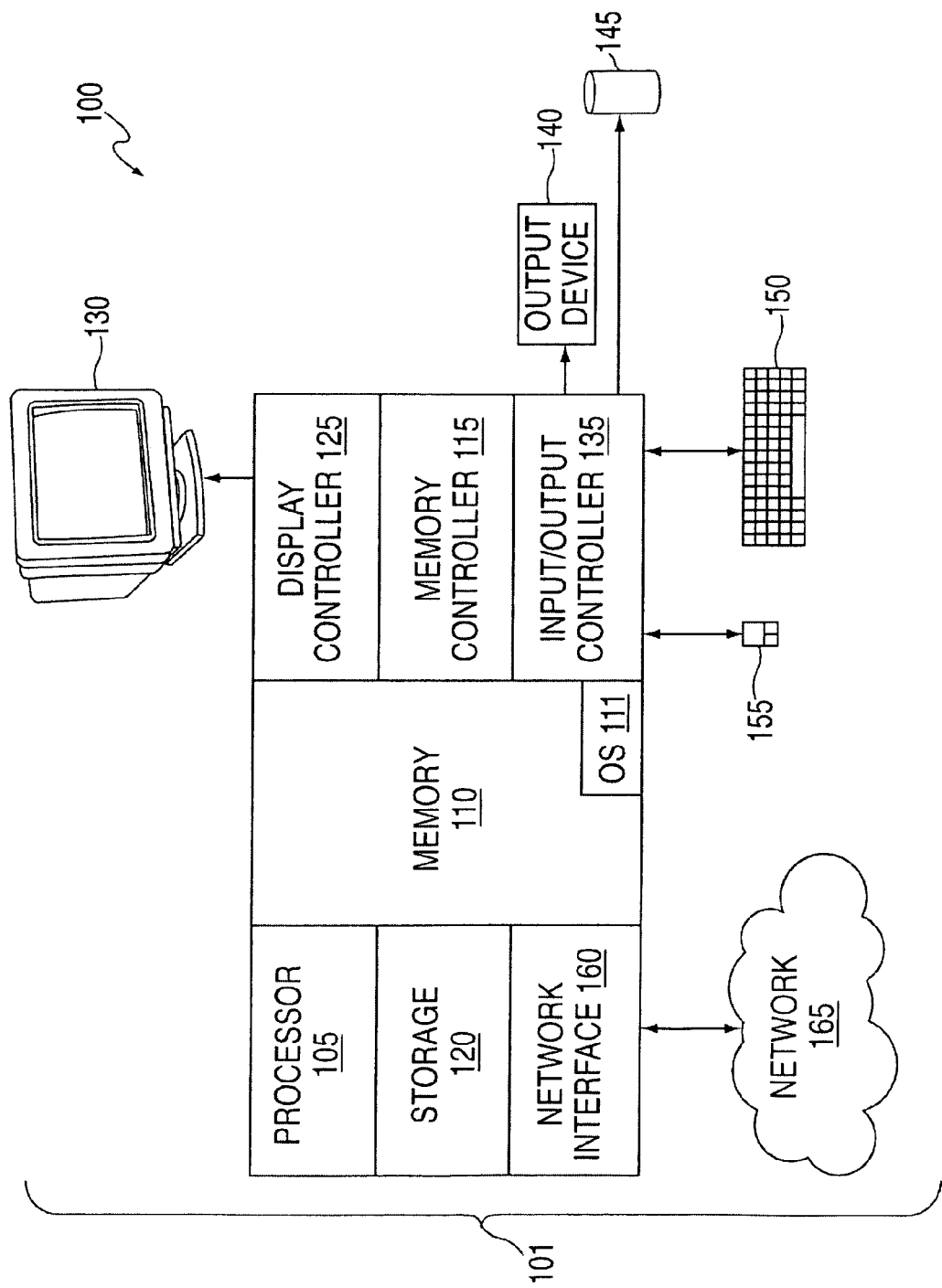
FIG. 7 illustrates an exemplary embodiment of a system for template-based vertical microcode instruction trace generation.

FIG. 7 illustrates an exemplary embodiment of a system 100 for template-based vertical microcode instruction trace generation. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

In an exemplary embodiment, the processor 105 can include a CISC architecture containing one-or-more instructions internally specified by some form of vertical microcode. In an exemplary embodiment, the processor 105 can include an instruction trace containing one-or-more of the vertical-microcode-specified instructions. The processors 105 can further include a testcase generator to target each of these vertical-microcode-specified instructions, and further simulate the testcases, thereby exposing the internals of the vertical microcode specific to each testcase. The processor is further configured to extract the specific vertical microcode and templatize the microcode. The processor 105 is further configured to rifle through an instruction trace, identify the vertical-microcode-specified instructions and their respective templates, and specify (or complete or define) their respective templates. The processor 105 is further configured to stitch the completed templates together in sequential order to form a vertical-microcode trace, and to interleaving the original instruction trace and the newly generated vertical-microcode trace together for seamless presentation to a microprocessor performance model.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the template-based vertical microcode instruction trace generation methods described herein in accordance with exemplary embodiments and a suitable operating system (OS) 111. The operating system 111 essentially controls the execution of other computer programs, such the template-based vertical microcode instruction trace generation systems and methods described herein, and provides scheduling, input-output control, file and data management, memory management, and communication control and related services.

The template-based vertical microcode instruction trace generation methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the template-based vertical microcode instruction trace generation methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The template-based vertical microcode instruction trace generation methods described herein and the OS 111, in whole or in part, but typically the latter, are read by the processor 105, perhaps buffered within the processor 105, and then executed.

When the systems and methods described herein are implemented in software, as is shown in FIG. 1, it the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The template-based vertical microcode instruction trace generation methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the template-based vertical microcode instruction trace generation methods are implemented in hardware, the template-based vertical microcode instruction trace generation methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include improved accuracy of microprocessor performance projections on CISC architectures that embody some form of vertical microcode.

As described above, the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. An instruction stream generation method for an instruction stream including millicoded instructions, the millicoded instructions being executed by an underlying millicode not visible to a program, the method comprising:
   generating a testcase for a millicoded instruction in an instruction trace pool, wherein the millicoded instruction is included in a parent instruction trace;
   processing the testcase to generate a millicode instruction trace snippet, the millicode instruction trace snippet comprising at least one millicode instruction for executing an instruction of the instruction stream;
   converting the millicode instruction trace snippet into a templatized millimode snippet by supplanting specific information located in the millicode instruction trace snippet with templatized information;
   processing, by a computer, the parent instruction trace one instruction at a time such that the templatized millimode snippet is accessed and updated with a value from the parent instruction case based on encountering the millicoded instruction in the parent instruction trace;
   writing the updated templatized millimode snippet to a millicoded instruction trace;
   providing the instruction stream to a performance model, wherein each occurrence of the millicoded instruction comprises the updated templatized millimode snippet from the millicoded instruction trace; and
   feeding the performance model the parent instruction trace included in the instruction stream, and based on encountering the millicoded instruction included in the instruction stream, feeding the performance model the millicoded instruction trace.

2. The method as claimed in claim 1 further comprising:
   capturing a repeating loop of instructions; and
   demarking a beginning and an end of the repeating loop with a hook.

3. The method as claimed in claim 1 further comprising:
   based on encountering an end of the millicoded instruction trace, feeding from the parent instruction trace.

4. The method as claimed in claim 1, wherein the processing the test case to generate a millicode instruction trace snippet comprises executing a millicode simulator.

5. The method as claimed in claim 1, wherein the millicode instruction trace snippet is edited to generate the templatized millimode snippet, wherein the editing of the millicode instruction trace snippet to generate a templatized millimode snippet comprises replacing an operand address with an indicator of a source of the operand address.

6. The method as claimed in claim 1, wherein the millicoded instruction trace comprises a plurality of templatized millimode snippets ordered based on an order of corresponding millicoded instructions in the parent instruction trace.

7. A computer program product for instruction trace generation for an instruction stream including millicoded instructions, the millicoded instructions being executed by an underlying millicode not visible to a program, the computer program product comprising:
   a non-transitory computer readable medium readable by a processing circuit and storing instructions for execution by the processing circuit for performing a method comprising:
   generating a testcase for a millicoded instruction in an instruction trace pool, wherein the millicoded instruction is included in a parent instruction trace;
   processing the testcase to generate a millicode instruction trace snippet, the millicode instruction trace snippet comprising at least one millicode instruction for executing an instruction of the instruction stream;
   converting the millicode instruction trace snippet into a templatized millimode snippet by supplanting specific information located in the millicode instruction trace snippet with templatized information;
   processing, by a computer, the parent instruction trace one instruction at a time such that the templatized millimode snippet is accessed and updated with a value from the parent instruction case based on encountering the millicoded instruction in the parent instruction trace;
   writing the updated templatized millimode snippet to a millicoded instruction trace;
   providing the instruction stream to a performance model, wherein each occurrence of the millicoded instruction comprises the updated templatized millimode snippet from the millicoded instruction trace; and feeding the performance model the parent instruction trace included in the instruction stream, and based on encountering the millicoded instruction included in the instruction stream, feeding the performance model the millicoded instruction trace.

8. The computer program product as claimed in claim 7, wherein the method further comprises:
   capturing a repeating loop of instructions; and
   demarking a beginning and an end of the repeating loop with a hook.

9. The computer program product as claimed in claim 7, wherein the method further comprises:
   based on encountering an end of the millicoded instruction trace, feeding from the parent instruction trace.

10. The computer program product as claimed in claim 7, wherein the processing the test case to generate a millicode instruction trace snippet comprises executing a millicode simulator.

11. The computer program product as claimed in claim 7, wherein the millicode instruction trace snippet is edited to generate the templatized millimode snippet, wherein the editing of the millicode instruction trace snippet to generate a templatized millimode snippet comprises replacing an operand address with an indicator of a source of the operand address.

12. The computer program product as claimed in claim 7, wherein the millicoded instruction trace comprises a plurality of templatized millimode snippets ordered based on an order of corresponding millicoded instructions in the parent instruction trace.

13. A computer system for instruction stream generation for an instruction stream including millicoded instructions, the millicoded instructions being executed by an underlying millicode not visible to a program, the system comprising:
   a processor, the system configured to perform a method comprising:
      generating a testcase for a millicoded instruction in an instruction trace pool, wherein the millicoded instruction is included in a parent instruction trace;
      processing the testcase to generate a millicode instruction trace snippet, the millicode instruction trace snippet comprising at least one millicode instruction for executing an instruction of the instruction stream;
      converting the millicode instruction trace snippet into a templatized millimode snippet by supplanting specific information located in the millicode instruction trace snippet with templatized information;
      processing the parent instruction trace, one instruction at a time such that the templatized millimode snippet is accessed and updated with a value from the parent instruction case based on encountering the millicoded instruction in the parent instruction trace;
      writing the updated templatized millimode snippet to a millicoded instruction trace;
      providing the instruction stream to a performance model, wherein each occurrence of the millicoded instruction comprises the updated templatized millimode snippet from the millicoded instruction trace; and
      feeding the performance model the parent instruction trace included in the instruction stream, and based on encountering the millicoded instruction included in the instruction stream, feeding the performance model the millicoded instruction trace.

14. The system as claimed in claim 13, wherein the method further comprises:
   capturing a repeating loop of instructions; and
   demarking a beginning and an end of the repeating loop with a hook.

15. The system as claimed in claim 13, wherein the method further comprises:
   based on encountering an end of the millicoded instruction trace, feeding from the parent instruction trace.

16. The system as claimed in claim 13, wherein the processing the test case to generate a millicode instruction trace snippet comprises executing a millicode simulator.

17. The system as claimed in claim 13, wherein the millicode instruction trace snippet is edited to generate the templatized millimode snippet, wherein the editing of the millicode instruction trace snippet to generate a templatized millimode snippet comprises replacing an operand address with an indicator of a source of the operand address.

\* \* \* \* \*